United States Patent [19]
Kashiwagi

[11] Patent Number: 4,554,239
[45] Date of Patent: Nov. 19, 1985

[54] RECORDING MATERIAL CONTAINING A DYED THERMALLY COAGULATABLE PROTEINACEOUS COMPOUND

[75] Inventor: Takashi Kashiwagi, Tokyo, Japan

[73] Assignee: Process Shizai Co., Ltd., Tokyo, Japan

[21] Appl. No.: 700,072

[22] Filed: Feb. 11, 1985

Related U.S. Application Data

[60] Continuation of Ser. No. 449,291, Dec. 13, 1982, abandoned, which is a continuation of Ser. No. 242,759, Mar. 11, 1981, abandoned, which is a division of Ser. No. 59,369, Jul. 20, 1979, Pat. No. 4,288,509.

[30] Foreign Application Priority Data

Jul. 21, 1978 [JP] Japan .................................. 53-88276

[51] Int. Cl.[4] .......................... G03C 1/76; B32B 3/10
[52] U.S. Cl. .................................. 430/270; 430/321; 430/332; 430/348; 430/293; 430/964; 430/559; 346/76 R; 346/135.1
[58] Field of Search .................. 430/5, 270, 294, 321, 430/332, 348, 293, 964, 559, 510; 427/53.1, 55, 160; 428/913, 457.2; 346/76 R, 77 R, 135.1

[56] References Cited

U.S. PATENT DOCUMENTS

| | | | |
|---|---|---|---|
| 3,514,597 | 5/1970 | De Haes et al. | 430/294 |
| 3,609,360 | 9/1971 | Wiese | 430/964 |
| 3,642,475 | 2/1972 | Vranchen et al. | 430/294 |
| 3,645,204 | 2/1972 | Gosnell | 430/964 |
| 3,698,902 | 10/1972 | Gaspar | 430/294 |
| 3,952,132 | 4/1976 | Kato et al. | 430/964 |
| 4,115,613 | 9/1978 | Inoue et al. | 430/348 |

OTHER PUBLICATIONS

Kosar, Light-Sensitive Systems, Feb. 1966, pp. 55 and 62.

*Primary Examiner*—Jack P. Brammer
*Attorney, Agent, or Firm*—Sughrue, Mion, Zinn, Macpeak, and Seas

[57] ABSTRACT

A recording material comprising a transparent support having formed thereon a recording layer containing a thermally coagulatable proteinaceous compound, the recording layer having an average optical density throughout the wavelength region of about 350 nm to 450 nm of at least about 1.5 is disclosed, which is suitable for preparing a reprographic material such as a photomask by flash exposure in heat conducting relation with an original.

8 Claims, No Drawings

RECORDING MATERIAL CONTAINING A DYED THERMALLY COAGULATABLE PROTEINACEOUS COMPOUND

This is a continuation of application Ser. No. 449,291, filed Dec. 13,1982, now abandoned which is a continuation of application Ser. No. 242,759, now abandoned, filed Mar. 11, 1981, which is a division of Ser. No. 59,369, filed July 20, 1979, now U.S. Pat. No. 4,288,509.

BACKGROUND OF THE INVENTION

1. Field of the Invention

The present invention relates to a thermal or heatsensitive recording material for reflectgraphy which can be used to produce image copies and optical masks. In more detail, the present invention relates to a thermal recording material using a coagulatable proteinaceous material which becomes insoluble by application of heat energy and to a process for preparing a photomask using the same.

2. Description of the Prior Art

In the field of thermographic or thermosensitive recording process, many thermal recording materials have been known which provide relief images by imagewise or informationwise insolubilizing a recording layer by the application of a heat pattern and removing the soluble areas of the recording material. These thermal insolubilization type relief imageforming processes can roughly be classified into the following three categories.

Type A Process: Type A Process is a process in which a thermal record is formed upon direct application of light from a light source. In a recording layer formed in Type A Process heat is generated by a substance which converts light to heat (such as a dark blue or black pigment like carbon black, graphite, and oxides of certain heavy metals) upon exposure to light, thereby heat-insolubilizing the recording layer and thus forming a record.

Type B Process: Type B Process is a process in which a record cannot be formed upon the direct application of light alone but can be formed when direct light from a light source is combined with reflected light from an original. In Type B Process a threshold value of thermal change for recording is not reached upon application of direct light alone but is exceeded when light reflected from an original is added to the direct light. For exposure a recording layer in Type B Process is generally interposed between the light source and the original such that light passing through the recording layer combines with light reflected from the original to exceed the threshold value, thus resulting in heat insolubilization.

Type C Process: Type C Process is a process in which no heat change occurs in the recording layer by application of light from a light source, but heat generated and accumulated in a heat-absorbing region of an original by exposure is transferred to the recording layer (in most cases by thermal contact) thus producing imagewise heat insolubilization. Thus, recording is accomplished in this type process by heat conduction from the original.

Type A Process is of the direct exposure type, and Type B and C Processes are of the indirect exposure type, i.e., the reflection exposure type.

Type C Process is disclosed in, for example, Japanese Patent Publication No. 557/70 corresponding to British Patents 1,139,891, 1,139,894, 1,139,895, and 1,139,896. The exposure time required for recording in Type C Process is generally sufficiently long that the heat transferred to the recording layer diffuses from the regions of the recording layer corresponding to the heat ray-absorbing regions of the original. Actually, electromagnetic radiation, for example, a heat ray or infrared radiation by filament tube is employed for this purpose. Thus, such results in some fringe insolubilization outside the areas to be recorded, and the images usually formed in the recording layer in Type C Process are not sharp and are of low quality.

Japanese Patent Publication No. 36080/71 corresponding to U.S. Pat. No. 3,661,579 discloses Type B Process and U.S. Pat. No. 3,580,719 discloses both Type A and B Processes in which a layer of a normally water-soluble polymer which when heated undergoes a loss in its normal solubility is contained, and a substance in heat-conducting relationship with the polymer which absorbs visible radiation and converts it into heat is contained in the recording layer. In reflectography, when a xenon flash lamp having an exposure time of less than $10^{-2}$ second is used to expose the recording layer in Type B Process in contact with an original, the heat generated and accumulated in the light-absorbing regions of the original will not affect the recording member since the very short exposure prevents an accumulation of heat in these areas. Hence, recording in accordance with Type C Process, conduction, cannot occur.

Japanese Patent Publication Nos. 9716/69, 9718/69, 22957/69, and 27919/71, corresponding to British Patent 1,139,892, and U.S. Pat. Nos. 3,523,791, 3,793,025 and 3,628,953, respectively teach that Type B Process can be realized by reducing the exposure time (less than $10^{-2}$ second) to prevent the occurrence of recording in accordance with Type C Process and adjusting the optical density of the recording layer to not more than 1 and preferably to about 0.2 to 0.8 to prevent the occurrence of recording in accordance with Type A Process.

The limits placed on the construction of the recording material in conventional Type B and Type C Process as discussed above render them unsuitable for use in the production of photomasks. In Type C Process due to the long exposure times usually required and the heat diffusion which occurs during that time, high quality images having good delineation cannot be produced. Type B Process may not suffer from heat diffusion and may provide sharp images, but the optical densities of the recording layer are not suitably high for use as photomasks.

SUMMARY OF THE INVENTION

It is a principal object of the present invention to overcome the aforesaid defects and to provide a thermal recording material in Type C Process which has a high sensitivity and is capable of producing high quality optical masks directly from an original without photographing with a camera.

It is another object of the present invention to provide a thermal recording material in Type C Process which has a high sensitivity suitable for flash exposure and recording.

It is still another object of the present invention to provide a thermal recording material in which the optical density of the recording layer is suitable for forming a photomask.

It is still another object of the present invention to provide a thermal recording material in Type C Process which forms sharp, high quality images without heat diffusion.

It is still another object of the present invention to provide a thermal recording material in Type C Process which has an optical density suitable for forming a photomask and which is free from the occurence of recording in accordance with Type A Process.

Accordingly, the present invention provides a recording material comprising a transparent support having formed thereon a recording layer containing a thermally coagulatable proteinaceous compound and having an average optical density throughout the wavelength region of about 350 nm to 450 nm of at least about 1.5. The present invention also provides a novel process of producing a photomask using the aforesaid thermal recording material.

DETAILED DESCRIPTION OF THE INVENTION

According to this invention, the recording layer contains a thermally coagulatable proteinaceous compound as a main ingredient and is formed on a support. The average optical density of the recording layer is adjusted to at least about 1.5 for the wavelength region of 350 to 450 nm. In accordance with a more preferred embodiment of the present invention, the optical density of the recording layer is at least about 1.5 for any wavelength in the region of 350 to 450 nm. This more preferred embodiment of the invention is to be contrasted with the generic invention wherein the "average" optical density is at least about 1.5 and which is open to optical densities less than 1.5 at some wavelengths in the 350 to 450 nm region. Preferably the optical density of the recording layer of the present invention is not more than about 1.5 and more preferably not more than about 1.0 at wavelengths of 560 nm and greater.

In this invention a thermal recording material in Type C Process is realized which can be recorded with flash exposure (less than $10^{-2}$ second) which does not suffer from heat diffusion and is able to produce high quality images with good delineation. Thus, the material of the present invention can be used to produce high quality photomasks which are capable of masking photosensitive materials (e.g., printing plates and printed circuit forming materials) sensitive to light in the wavelength region of about 350 to 450 nm. In contrast to the recording material in conventional Type C Process in which the recording material does not lend itself to flash exposure, the recording material in Type C Process in accordance with the present invention is based on a thermally coagulatable proteinaceous compound which can be insolubilized with an amount of energy which is low in comparison with that in conventional Type C Process.

The optical density of the recording layer used in the present invention is achieved by incorporating a coloring material into the recording layer. Generally, although not necessarily, the coloring material is a yellow, orange or red dye and/or pigment, which is added to the recording layer in order to adjust the average optical density to at least about 1.5 throughout the wavelength region of about 350 to 450 nm. In terms of the amount of the coloring material, this generally requires about 5 to 75 wt % coloring material be present in the recording layer.

Representative examples of suitable coloring materials include Chrysamine (C.I. 22530; C.I. stands for color index), Pure Yellow 5G (C.I. 13920), Orange GG Conc (C.I. 23375), Fast Orange S (C.I. 29150), Fast Red F (C.I. 22310) and Benzopurpurine 4B (C.I. 23500); acid dyes such as Naphthol Yellow S (C.I. 10316), Quinoline Yellow (C.I. 47005), Orange II (C.I. 15510), Eosine (C.I. 45380), Citronine RY (C.I. 13091), Light Orange GX (C.I. 16230), Fast Scarlet A (C.I. 14900), Brilliant Scarlet 3R (C.I. 16255), Rhodamine B (C.I. 45100) and Rose Bengale (C.I. 45440); basic dyes such as Auramine (C.I. 41000), Flavin 8G (C.I. 49005), Chrysoidine 3R (C.I. 11320), Acridine Orange (C.I. 46005) and Rhodamine 6G (C.I. 45170); azoic red pigments such as Permanent Red (C.I. 12310), Permanent Carmine (C.I. 12490), Watchung Red (C.I. 15865), Lithol Red (C.I. 15630), Brilliant Carmine 6B (C.I. 15850) and Rhodamine 6G Lake (C.I. 45160); azo, threne or pyrazolone type orange pigments such as Threne Brilliant Orange (C.I. 59300), Pyrazolone Orange (C.I. 21110), Vulcan Orange (C.I. 21160) and Orange Lake (C.I. 15510); and azoic yellow pigments such as Hansa Yellow G (C.I. 11710), Benzidine Yellow G (C.I. 21090), and Vulcan Fast Yellow G (C.I. 21095). It is noted, however, the present invention is not limited to the use of these coloring materials or to coloring materials per se.

Examples of the thermally coagulatable proteinaceous compounds used in this invention include such as albumin, hemoglobin, globulin, prolamin, and glutelin; and proteinaceous materials produced commercially as animal or vegetable proteins, such as egg white composed mainly of albumin, dried egg white, blood powder composed mainly of hemoglobin, soybean protein composed mainly of globulin (dried soybean milk, concentrated soybean protein powder), wheat gluten (active wheat protein) composed mainly of prolamin and glutelin, and corn protein (sein) composed mainly of prolamin.

The recording material of the present invention is prepared as follows.

Thermally coagulatable compounds which are water-soluble such as albumin or hemoglobin are used as an aqueous solution. The aforesaid coloring materials are added to the aqueous solution and the resulting solution is coated on a support and dried to form a recording layer. Globulin, prolamin and glutelin are water-insoluble and are dissolved in a dilute aqueous solution of a neutral salt, acid or alkali, or a solution obtained by using a series of materials typified by urea, a known denaturant. The solution is coated on a support to form a recording layer. The thickness of the recording layer of the present invention is not particularly limited, as long as the average optical density of the recording layer is at least about 1.5. One skilled in the art will realize that such a density can be achieved by adjusting the thickness of the layer together with the amount of coloring material present in the layer. However, the recording layer of the present invention is generally about 0.5 to 20 μm thick from the standpoint of sensitivity, resolving power, etc.

If desired, in order to increase film-forming ability and to disperse the coloring material, the aforesaid recording layer may contain a polymeric compound such as gelatin, polyvinyl pyrrolidone, polyvinyl alcohol (generally having a degree of saponification of 95% or less), polyethylenimine, ethylhydroxy cellulose, carboxymethyl cellulose, a copolymer of vinyl methyl ether and maleic anhydride, polyacrylamide, or a copolymer of acrylamide. Furthermore, the recording layer may contain an antiseptic or a mold-proofing agent. These materials are used in an amount so as not to adversely affect the function of the recording layer. Furthermore, the recording material of the present invention may be provided with a protective layer to improve mechanical strength and moisture resistance.

The support used in the present invention is not particularly limited. However, it is necessary to choose materials whose quality does not change, which are not deformed during the processings of the recording materials, etc. Transparent plastic films of polyethylene terephthalate, polycarbonates, polyvinyl chloride, polystyrene or triacetate can be used as the support in the recording material of this invention. Desirably, transparent films having good dimensional stability such as polyethylene terephthalate films are used. Further, the surface of the support can be subbed with a subbing layer or can be processed so as to improve adhesion of the support to the heat-sensitive recording layer.

The recording material of this invention can be used as described below.

The recording layer of the recording material of this invention is brought into intimate contact with an original having an image capable of absorbing heat, and electromagnetic radiations is applied to the assembly from the side of the transparent support using a flash light source with an exposure time of less than $10^{-2}$ second. Good results are obtained using a xenon gas discharge lamp which can supply an energy of 200-2,000 w.-sec. in $10^{-4}$ to $10^{-2}$ second. As a result, the image area of the original absorbs the electromagnetic radiation and generates and accumulates heat. At this time, the recording layer in close contact (heat-conducting relation) with the original receives the heat and undergoes thermal changes. As a result, that area of the recording layer which corresponds to the image of the original becomes water-insoluble. Accordingly, after recording when the recording material is treated with flowing water, that portion of the recording layer which has not undergone thermal change is removed and a colored relief image is obtained. While flowing water is preferred for removing the soluble portion of the recording layer other solvents can be used.

Since the colored relief image is recorded within a short period of time of less than $10^{-2}$ second, it is scarcely affected by the diffusion of heat in the transverse direction of the recording layer and a clear sharp image can be obtained by exposure for a period of $10^{-2}$ to $10^{-5}$ second.

By selecting the type and amount of the coloring material included in the recording layer, the colored relief image exhibits an average optical density of at least about 1.5 with respect to electromagnetic radiation at a wavelength of about 350 to 450 nm. Accordingly, it is suitable as a photomask for photosensitive materials having a sensitive wavelength region of 350 to 450 nm, for example, photosensitive materials for making printing plates.

The following Examples illustrate the present invention in more detail. Unless otherwise indicated all percentages are by weight.

EXAMPLE 1

10 g of egg white albumin (JIS K8068, a product of Kanto Chemical Co., Ltd.) was added to 30 g of water, and the mixture was allowed to stand overnight. The mixture was then stirred while maintaining it at 20° to 30° C. Tiny amounts of insoluble ingredients were removed by filtration to prepare an approximately 25% aqueous solution of albumin.

Separately, 4 g of Permanent Red 4R (C.I 12120; a product of Tokyo Color Materials Co., Ltd.), 1 g of Symuraer Fast Yellow (C.I. 11680; a product of Dai Nippon Ink and Chemicals, Inc.), 20 g of a 10% aqueous solution of polyvinyl pyrrolidone having a weight average molecular weight of 360,000, 1 g of polyethylene glycol having a weight average molecular weight of 6,000 (a product of Kanto Chemical Co., Ltd.) and 74 g of water were mixed and dispersed in a ball mill for 48 hours.

To 10 g of the aqueous albumin solution was added 20 g of the pigment dispersion, and they were stirred to form a uniform coating solution.

The coating solution was coated on a 75 μm thick polyester film by means of a wire bar, and dried in hot air at about 40° C. to obtain a recording film. The optical density of the recording material was 2.5 at 350 nm to 450 nm, and 0.7 at more than 560 nm (measured by a MACBETH DENSITOMETER Model TD-102, Wratten #47B equipped with a #25 filter, made by Eastman Kodak Company).

The recording layer of the resulting recording material was brought into close contact with a reflection original bearing an image printed in black ink. The dial of a xenon flash printer (RISO XENOFAX FX-105, made by Riso Kagaku Kogyo Kabushiki Kaisha) was set at TX-5, and the recording layer was exposed from the support side. Then, the recording film was washed with flowing water at room temperature to obtain a red positive image.

The recording film having the resulting red positive image was used as a mask, and brought into intimate contact with a positive-positive type PS plate (SGP, a product of Fuji Photo Film Co., Ltd.). The PS plate was exposed for 45 seconds to light from a 3 kw metal halide lamp disposed 1 meter away as a light source, and developed to obtain a printing plate having a positive image.

Offset printing was performed using this printing plate. Printed copies of good quality were obtained.

EXAMPLE 2

A recording film was prepared in the same way as in Example 1 except that an aqueous solution prepared by dissolving 4 g of Aizen Eosine GH Conc (C.I. 45380; an acid dye made by Hodogaya Chemical Co., Ltd.) and 1 g of Acid Orange II (C.I. 15510; an acid dye made by Yodogawa Chemical Industry Co., Ltd.) in water to make the total amount 100 g was used instead of the pigment dispersion used in Example 1.

Reflection printing was performed by using the resulting recording film in the same way as in Example 1; and treated with flowing water to obtain a red image of good quality.

EXAMPLE 3

10 g of soybean protein powder (Sol-P 200, a product of The Nisshin Oil Mills, Ltd.), 15 g of thiourea (reagent grade 1, a product of Wako Pure Chemical Industries, Ltd.) were added to 75 g of water. After standing overnight, the mixture was well stirred to form a uniform solution.

Separately, 4 g of Brilliant Carmine 6B (C.I. 15850, a pigment made by Tokyo Color Materials Co., Ltd.), 1 g of Hansa Yellow G (C.I. 11680; a pigment made by Tokyo Ink Co., Ltd.), 20 g of a 10% aqueous solution of polyvinyl pyrrolidone (K-90), 1 g of polyethylene glycol (PEG #6000) and 74 g of water were mixed, and dispersed in a ball mill for 48 hours to prepare a pigment dispersion.

To 10 g of the soybean protein solution was added 20 g of the pigment dispersion. They were well stirred to form a uniform coating solution. The coating solution was coated on a 75 μm thick polyester film by means of a wire bar and dried in hot air at about 40° C. to form the same recording film as in Example 1.

Reflection printing was performed in the same way as in Example 1 using the resulting recording film. A similar result was obtained.

EXAMPLE 4

The same recording film as in Example 1 was prepared in the same way as in Example 1 except that an aqueous dye solution obtained by dissolving 1 g of Auramine Extra O-125 (C.I. 41000; a basic dye made by Sumitomo Chemical Co., Ltd.) and 4 g of Rhodamine B (C.I. 45170; a basic dye made by Sumitomo Chemical Co., Ltd.) in water to make the total amount 100 g was used instead of the pigment dispersion used in Example 3.

EXAMPLE 5

10 g of wheat gluten (reagent, a product of Wako Pure Chemical Industries, Ltd.), and 12 g of urea (reagent grade 1, a product of Wako Pure Chemical Industries, Ltd.) were added to 78 g of water. After standing overnight, the mixture was well stirred to form a uniform solution.

Separately, 4 g of Permanent Carmine 2B (C.I. 12490, a product of Dainichiseika Colour & Chemicals Mfg. Co., Ltd.), 1 g of Pyrazolone Orange (C.I. 21110, a product of Tokyo Color Materials Co., Ltd.), 20 g of a 10% aqueous solution of polyvinyl pyrrolidone (K-90), 1 g of polyethylene glycol (PEG #6000) and 74 g of water were mixed and dispersed in a ball mill for 48 hours to prepare a red pigment dispersion.

To 10 g of the wheat gluten solution was added 20 g of the pigment dispersion. They were well stirred to form a uniform coating solution. The coating solution was coated on a 100 μm thick polyester film by means of a wire bar and dried in hot air at about 40° C. to a form a recording film.

The optical density of the recording film as measured in the same way as in Example 1, and found to be 2.8 at 350 nm to 450 nm, and 0.6 at more than 560 nm.

Reflection printing was performed in the same way as in Example 1 using the resulting recording film. A similar result was obtained.

EXAMPLE 6

A recording film was prepared in the same way as in Example 1 except that 20 g of a dye solution obtained by dissolving 4 g of Aizen Direct Fast Red FH (C.I. 22310; a direct dye made by Hodogaya Chemical Co., Ltd.), and 1 g of Nippon Orange GG Conc (C.I. 23375; a direct dye made by Sumitomo Chemical Co., Ltd.) in water to make the total amount 100 g was used instead of the pigment dispersion used in Example 5. A similar result was obtained.

EXAMPLE 7

10 g of corn sein (reagent, a product of Wako Pure Chemical Industries, Ltd.) and 2 g of ϵ-caprolactam were dissolved in 88 g of 70% hydrous alcohol to form a uniform solution.

Separately, 4 g of Watchung Red B (C.I. 15865; a product of Tokyo Ink Mfg. Co., Ltd.), 1 g of Symuraer Fast Yellow 5GF (C.I. 21095; a product of Dai Nippon Ink and Chemicals, Inc.), 20 g of a 10% aqueous solution of polyvinyl pyrrolidone (K-90), 1 g of polyethylene glycol and 74 g of water were mixed and dispersed in a ball mill for 48 hours to prepare a red pigment dispersion.

To 10 g of the corn sein solution was added 20 g of the pigment dispersion. They were well stirred to form a uniform coating solution. The coating solution was coated on a 100 μm thick polyester film by means of a wire bar and dried in hot air at about 40° C. to form a recording film.

The optical density of the resulting recording film was measured in the same way as in Example 1 and found to be 2.2 at 350 nm to 450 nm, and 0.3 at more than 560 nm.

Reflection printing was performed in the same way as in Example 1 using the resulting film. A similar result was obtained.

While the invention has been described in detail and with reference to specific embodiments thereof, it will be apparent to one skilled in the art that various changes and modifications can be made therein without departing from the spirit and scope thereof.

What is claimed is:

1. A thermal recording material for flash exposure and reflection printing comprising a transparent support having formed thereon a recording layer containing a thermally coagulatable proteinaceous compound, wherein a coloring material is present in said recording layer in an amount such that said recording layer has an average optical density in the wavelength region of 350 nm to 450 nm of at least about 1.5 and does not have an optical density greater than 1.5 at wavelength of about 560 nm or greater.

2. The recording material of claim 1, wherein said recording layer is about 0.5 to 20 μm thick.

3. The recording material of claim 1, wherein said coloring material is present in said layer in an amount of about 5 to 75 wt %.

4. The recording material of claim 1, wherein said thermally coagulatable proteinaceous compound is albumin, hemoglobin, globulin, prolamin or glutelin.

5. The recording material of claim 1, wherein said recording layer additionally contains an antiseptic or a mold-proofing agent.

6. The recording material of claim 1, wherein said recording layer additionally contains a film-forming agent.

7. The recording material of claim 1, wherein said coloring material is a dye and/or pigment.

8. The recording material of claim 7, wherein said dye and/or pigment is red, yellow or orange.

* * * * *